United States Patent
Tsujita

(10) Patent No.: US 10,583,698 B2
(45) Date of Patent: Mar. 10, 2020

(54) WHEEL POSITION IDENTIFICATION DEVICE

(71) Applicant: PACIFIC INDUSTRIAL CO., LTD., Ogaki-shi, Gifu-ken (JP)

(72) Inventor: Yasuhisa Tsujita, Motosu (JP)

(73) Assignee: PACIFIC INDUSTRIAL CO., LTD., Ogaki-Shi, Gifu-Ken (JP)

( * ) Notice: Subject to any disclaimer, the term of this patent is extended or adjusted under 35 U.S.C. 154(b) by 188 days.

(21) Appl. No.: 15/576,597

(22) PCT Filed: May 25, 2016

(86) PCT No.: PCT/JP2016/065511
§ 371 (c)(1),
(2) Date: Nov. 22, 2017

(87) PCT Pub. No.: WO2016/190371
PCT Pub. Date: Dec. 1, 2016

(65) Prior Publication Data
US 2018/0147899 A1    May 31, 2018

(30) Foreign Application Priority Data
May 28, 2015 (JP) ................................. 2015-108723

(51) Int. Cl.
*B60C 23/04* (2006.01)
*G01L 17/00* (2006.01)
(Continued)

(52) U.S. Cl.
CPC .......... *B60C 23/0416* (2013.01); *B60C 23/04* (2013.01); *B60C 23/0488* (2013.01);
(Continued)

(58) Field of Classification Search
CPC ....... G01S 13/931; B60C 23/00; B60C 23/04; B60C 23/0408; B60C 23/0415; B60C 23/0416; G01L 17/00; G01L 17/005
See application file for complete search history.

(56) References Cited

U.S. PATENT DOCUMENTS 5,808,190 A * 9/1998 Ernst ..................... B60C 23/061
116/34 R
6,112,587 A * 9/2000 Oldenettel .......... B60C 23/0416
340/445
(Continued)

FOREIGN PATENT DOCUMENTS

CN    104080624 A    10/2014
JP    2010122023 A    6/2010
(Continued)

OTHER PUBLICATIONS

International Preliminary Report on Patentability and Written Opinion of the ISR; International Appl. No. PCT/JP2016/065511, International Filing Date May 25, 2016, Priority Date May 28, 2015, 5 pages.
(Continued)

*Primary Examiner* — Peter M Bythrow
(74) *Attorney, Agent, or Firm* — Cantor Colburn LLP

(57) ABSTRACT

When receiving a transmission signal, a reception controller obtains a pulse count value of each of rotation sensor units. Next, the reception controller compares, with a threshold, the difference between the obtained pulse count value and a previously obtained pulse count value. The reception controller identifies, based on the result of comparison between the difference between pulse count values and the threshold, the positions of wheel assemblies, in each of which a transmitter is provided.

2 Claims, 6 Drawing Sheets

(51) Int. Cl.
*G01D 5/48* (2006.01)
*G01S 13/06* (2006.01)

(52) U.S. Cl.
CPC ................ *G01D 5/48* (2013.01); *G01L 17/00* (2013.01); *G01S 13/06* (2013.01)

(56) References Cited

U.S. PATENT DOCUMENTS

| | | | | |
|---|---|---|---|---|
| 6,731,205 | B2* | 5/2004 | Schofield | B60C 23/0416 116/34 R |
| 7,237,433 | B2* | 7/2007 | Walenty | B60C 23/0408 340/447 |
| 7,336,161 | B2* | 2/2008 | Walraet | B60C 23/0416 340/442 |
| 8,436,724 | B2* | 5/2013 | Hannon | B60C 23/0416 340/445 |
| 8,686,840 | B2 | 4/2014 | Drummond et al. | |
| 9,434,217 | B2* | 9/2016 | Mori | B60C 23/0416 |
| 2004/0066290 | A1* | 4/2004 | Hernando | B60C 23/0416 340/447 |
| 2006/0179930 | A1* | 8/2006 | Lin | B60C 23/0408 73/146.2 |
| 2006/0250228 | A1* | 11/2006 | Mori | B60C 23/0416 340/447 |
| 2010/0013618 | A1* | 1/2010 | Patel | B60C 23/0408 340/447 |
| 2010/0134269 | A1* | 6/2010 | Zhu | B60C 23/041 340/447 |
| 2011/0169627 | A1* | 7/2011 | Fink | B60C 23/0416 340/442 |
| 2012/0059551 | A1* | 3/2012 | Juzswik | B60C 23/0416 701/49 |
| 2012/0112899 | A1* | 5/2012 | Hannon | B60C 23/0416 340/445 |
| 2012/0259507 | A1* | 10/2012 | Fink | B60C 23/0416 701/32.7 |
| 2014/0019003 | A1* | 1/2014 | Guinart | B60C 23/0416 701/34.4 |
| 2015/0057876 | A1* | 2/2015 | Graham | B60C 23/0489 701/33.4 |
| 2015/0057878 | A1* | 2/2015 | Friel | B60C 23/0416 701/34.4 |
| 2015/0191056 | A1* | 7/2015 | Mori | B60C 23/0416 73/146.5 |

FOREIGN PATENT DOCUMENTS

| | | |
|---|---|---|
| JP | 2011527971 A | 11/2011 |
| JP | 2014031144A A | 2/2014 |
| JP | 2014511796 A | 5/2014 |
| JP | 2015054545 A | 3/2015 |
| JP | 201574388 A | 4/2015 |
| JP | 2015074387 A | 4/2015 |
| WO | 2013108609 A1 | 7/2013 |
| WO | 2015025227 A2 | 2/2015 |

OTHER PUBLICATIONS

Office Action issued in Chinese Patent Application No. 2019011401657520, dated Jan. 17, 2019 (7 pages).

Enclosed is the translation of the International Preliminary Report on Patentability and Written Opinion of the International Searching Authority; International Appl. No. PCT/JP2016/065511, International Filing Date May 25, 2016, Priority Date May 28, 2015, 5 pages.

* cited by examiner

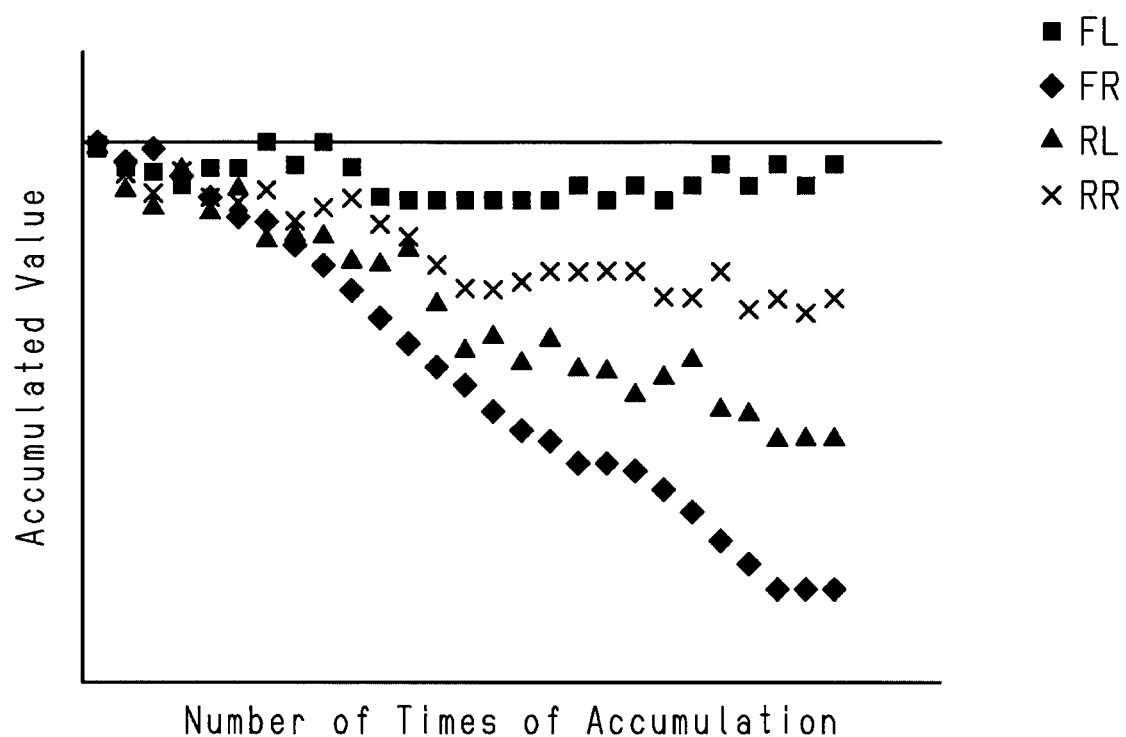

WHEEL POSITION IDENTIFICATION DEVICE

TECHNICAL FIELD

The present invention relates to a wheel assembly position identifying apparatus.

BACKGROUND ART

Wireless tire condition monitoring apparatuses have been proposed that permit the driver in the passenger compartment to check the conditions of the tires of the vehicle. Typically, a tire condition monitoring apparatus includes a receiver mounted in the vehicle body and transmitters attached to the respective wheel assemblies. Each transmitter detects the pressure in the tire. In addition, each transmitter wirelessly transmits a data signal including data indicating the condition of the tire from the transmission antenna.

The receiver receives signals transmitted from the transmitters. Then, the receiver displays information on the pressure of the tires on the display provided in the passenger compartment, as necessary. The tire condition monitoring apparatus preferably identifies which of the tires has the transmitter that has transmitted the received data signal. In other words, the receiver preferably identifies the position of the wheel assembly associated with the received data signal.

Patent Document 1 discloses an apparatus that identifies in which of the wheel assemblies each transmitter is provided. In this apparatus, the transmitters each send the rotation angle of the corresponding wheel assembly to the receiver by a radio signal. Each time the receiver receives a radio signal, it obtains the rotation angles of the wheel assemblies from rotational position detecting sections. The receiver monitors changes in the relative angles between the rotation angle received from each transmitter and the rotation angles obtained from the rotational position detecting sections when the rotation angle is received from each transmitter. Then, the receiver identifies the wheel assembly with the smallest change in the relative angle as the wheel assembly provided with the transmitter that has transmitted the radio signal.

PRIOR ART DOCUMENT

Patent Document

Patent Document 1: Japanese Laid-Open Patent Publication No. 2010-122023

SUMMARY OF THE INVENTION

Problems that the Invention is to Solve

In Patent Document 1, in order to identify the wheel assembly positions, advanced statistical processing is needed to monitor changes in the relative angle between two rotation angles, which results in a large load on the wheel assembly position identifying apparatus.

Accordingly, it is an objective of the present invention to provide a wheel assembly position identifying apparatus capable of reducing the load on the processing for identifying the positions of wheel assemblies.

Means for Solving the Problems

To achieve the foregoing objective and in accordance with a first aspect of the present disclosure, a wheel assembly position identifying apparatus is provided, which is mounted in a vehicle having rotational position detecting sections that detect, as detection values, rotational positions of respective wheel assemblies. A transmitter is provided in each of the wheel assemblies. The apparatus identifies in which of the wheel assemblies each transmitter is provided. The apparatus includes a receiver, an obtaining section, a calculating section, and an identifying section. The receiver receives transmission signals that are each transmitted from one of the transmitters when the rotational position of the corresponding wheel assembly is a specific position. The obtaining section obtains the rotational position of each wheel assembly from the corresponding rotational position detecting section each time the receiver receives the transmission signal. The calculating section calculates a difference between the rotational position obtained by the obtaining section and a previously obtained rotational position. The identifying section identifies the positions of the wheel assemblies, which are provided with the transmitters, by comparing the difference with a threshold. An accumulation threshold is employed as the threshold. The accumulation threshold is used to determine whether the received transmission signal has been transmitted at the specific position. The identifying section determines whether an absolute value of the difference is greater than or equal to the accumulation threshold. The identifying section also accumulates the number of times the absolute value of the difference is determined to be greater than or equal to the accumulation threshold or the number of times the absolute value of the difference is determined to be less than the accumulation threshold. The identifying section identifies the positions of the wheel assemblies, in which the transmitters are provided, from an accumulated value obtained through the accumulation.

To achieve the foregoing objective and in accordance with a second aspect of the present disclosure, a wheel assembly position identifying apparatus is provided, which is mounted in a vehicle having rotational position detecting sections that detect, as detection values, rotational positions of respective wheel assemblies. A transmitter is provided in each of the wheel assemblies. The apparatus identifies in which of the wheel assemblies each transmitter is provided. The apparatus includes a receiver, an obtaining section, a calculating section, and an identifying section. The receiver receives transmission signals that are each transmitted from one of the transmitters when the rotational position of the corresponding wheel assembly is a specific position. The obtaining section obtains the rotational position of each wheel assembly from the corresponding rotational position detecting section each time the receiver receives the transmission signal. The calculating section calculates a difference between the rotational position obtained by the obtaining section and a previously obtained rotational position. The identifying section identifies the positions of the wheel assemblies, which are provided with the transmitters, by comparing the difference with a threshold. A predetermined range is employed as the threshold. The identifying section determines whether the difference is within the predetermined range. The identifying section also accumulates either a positive value or a negative value depending on whether the difference is greater than or smaller than the predetermined range. The identifying section identifies the positions of the wheel assemblies, in which the transmitters are provided, from an accumulated value obtained through the accumulation.

BRIEF DESCRIPTION OF THE DRAWINGS

FIG. 10 is a graph showing the accumulated values by the second wheel assembly position identifying process.

MODES FOR CARRYING OUT THE INVENTION

A wheel assembly position identifying apparatus according to one embodiment of the present invention will now be described with reference to FIGS. 1 to 10.

Figure 1B:
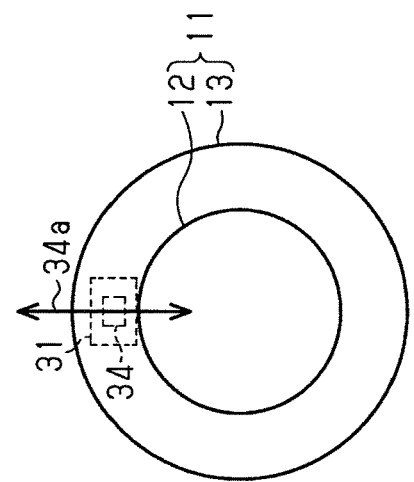
FIG. 1B is a diagram showing the relationship between the detection axis of an acceleration sensor and a wheel assembly.
Figure 1A:
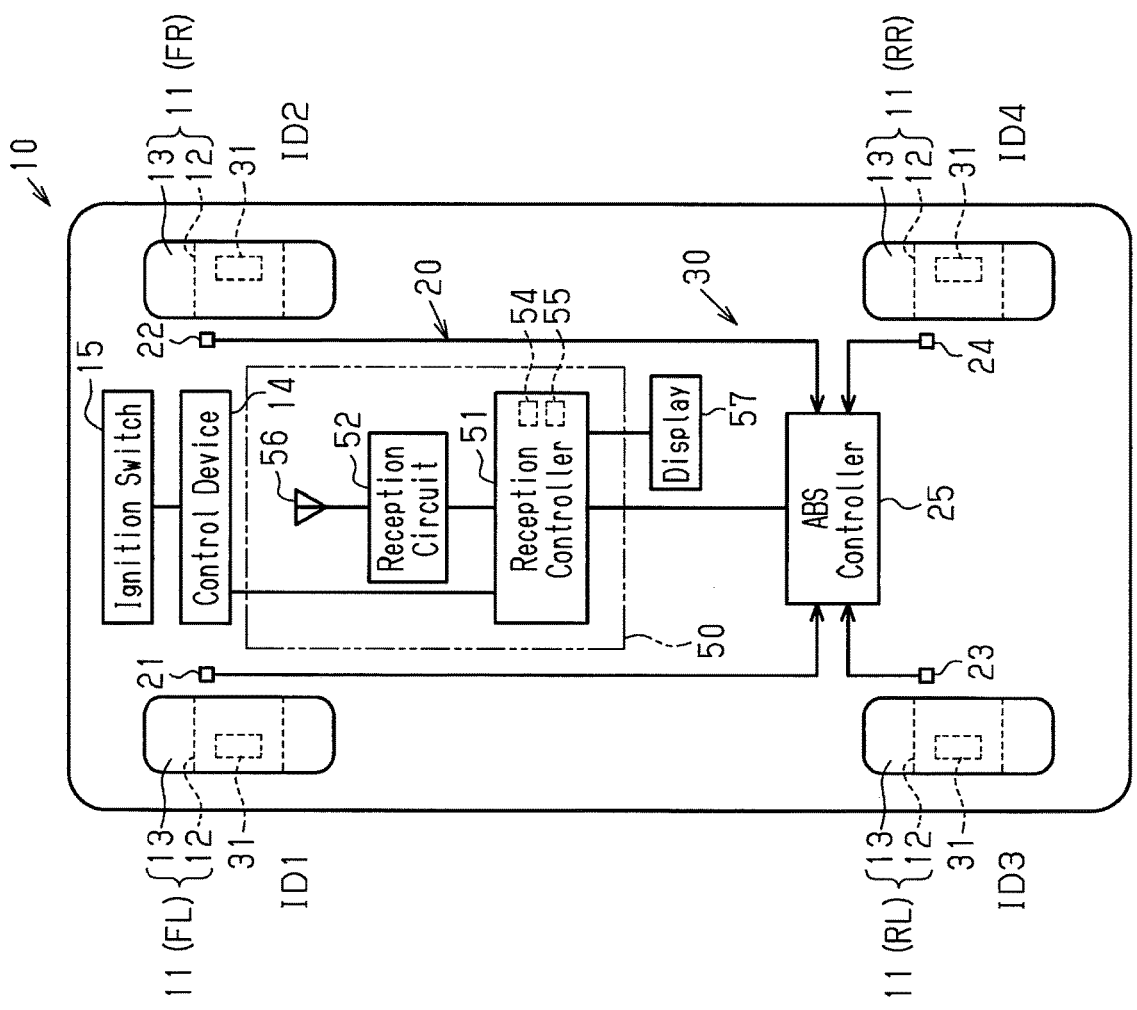
FIG. 1A is a block diagram schematically showing a vehicle in which a tire condition monitoring apparatus according to one embodiment of the present invention is mounted.

As shown in FIG. 1A, a vehicle 10 is equipped with an anti-lock braking system (ABS) 20 and a tire condition monitoring apparatus 30. The ABS 20 includes an ABS controller 25 and rotation sensor units 21 to 24, each of which corresponds to one of the four wheel assemblies 11 of the vehicle 10. The first rotation sensor unit 21 corresponds to the left-front wheel assembly FL and the second rotation sensor unit 22 corresponds to the right-front wheel assembly FR. The third rotation sensor unit 23 corresponds to the left-rear wheel assembly RL and the fourth rotation sensor unit 24 corresponds to the right-rear wheel assembly RR. Each wheel assembly 11 includes a vehicle wheel 12 and a tire 13 attached to the vehicle wheel 12. The ABS controller 25 is configured by a microcomputer and the like and obtains the rotational positions (rotation angles) of the wheel assemblies 11 based on signals from the rotation sensor units 21 to 24. The vehicle 10 is also equipped with a control device 14, which controls operations such as starting and stopping of the engine in an integrated manner. An ignition switch 15 is connected to the control device 14. The ignition switch 15 allows the engine to be started and stopped through a switching operation by the driver.

Figure 2:
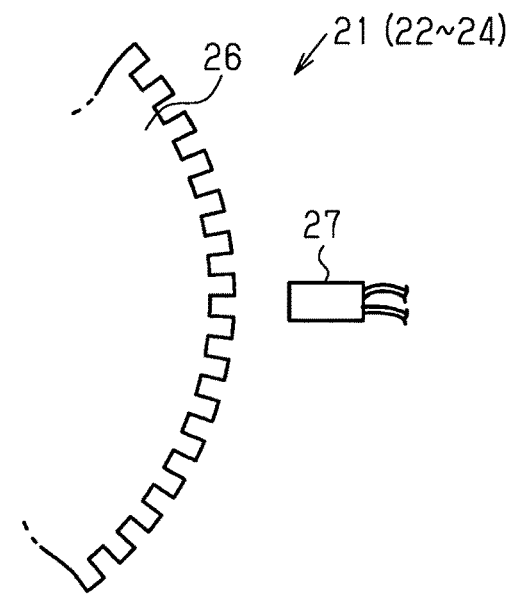
FIG. 2 is a schematic diagram showing a rotation sensor unit.

As shown in FIG. 2, each of the rotation sensor units 21 to 24, which serves as a rotational position detecting section, includes a gear 26, which rotates integrally with the wheel assembly 11, and a detector 27, which is arranged to face the outer circumferential surface of the gear 26. The gear 26 has multiple teeth (forty-eight teeth in the present embodiment) at equal angular intervals on the outer circumferential surface. The detector 27 detects pulses generated by rotation of the gear 26. The ABS controller 25 is connected to each detector 27 by a wire. The ABS controller 25 obtains the rotational positions of the wheel assemblies 11 based on the count values of pulses (hereinafter, referred to as pulse count values) of the detectors 27. Specifically, at each rotation of the gear 26, the detector 27 generates pulses the number of which corresponds to the number of the teeth. The ABS controller 25 counts the pulses generated by the detector 27. The degree of rotation of the gear 26 per pulse count, that is, the rotational position (rotation angle) of the wheel assembly 11, is obtained by dividing 360 degrees by the number of pulses generated by the detector 27 while the wheel assembly 11 rotates one revolution (360 degrees).

Figure 3:
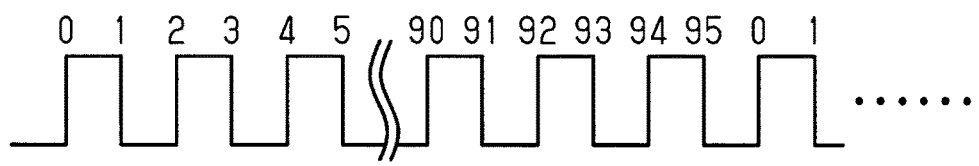
FIG. 3 is a diagram showing pulses generated by a detector and a manner in which the pulses are counted.

As shown in FIG. 3, the ABS controller 25 counts from 0 to 95 based on rising edges and falling edges of pulses.

As shown in FIG. 1A, the tire condition monitoring apparatus 30 includes four transmitters 31 and a receiver 50. Each transmitter 31 is located in one of the four wheel assemblies 11. The receiver 50 is located in the vehicle body. Each transmitter 31 is arranged in the internal space of the tire 13 attached to the vehicle wheel 12. Each transmitter 31 detects the condition of the associated tire 13. The transmitter 31 then wirelessly transmits a signal including data that indicates the tire condition.

Figure 4:
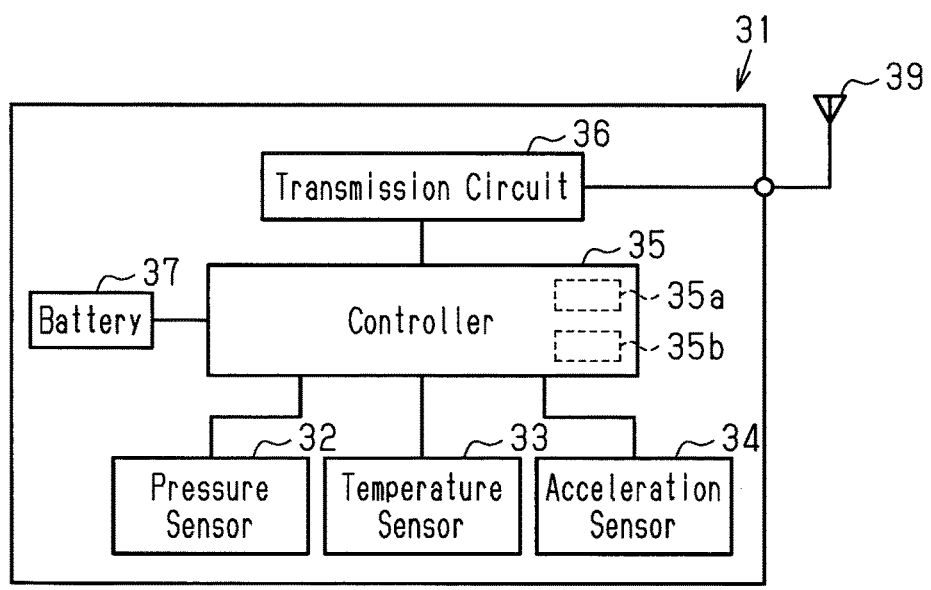
FIG. 4 is a block diagram schematically showing a transmitter.

As shown in FIG. 4, each transmitter 31 includes a pressure sensor 32, a temperature sensor 33, an acceleration sensor 34, a controller 35, a transmission circuit 36, a battery 37, and a transmission antenna 39. The transmitter 31 is driven by electricity supplied from the battery 37. The controller 35 controls operations of the transmitter 31 in an integrated manner. The pressure sensor 32 detects the pressure in the associated tire 13 (tire air pressure). The temperature sensor 33 detects the temperature in the associated tire 13 (tire internal temperature).

As shown in FIG. 1B, the acceleration sensor 34 is arranged such that a detection axis 34a is oriented in the vertical direction when the transmitter 31 is at the highest position (or the lowest position) in the wheel assembly 11. The acceleration sensor 34 outputs as a voltage that corresponds to the amount of deformation of a detecting section (for example, a diaphragm) provided along the detection axis 34a. The detection axis 34a is used to detect the acceleration (centrifugal acceleration) due to the centrifugal force during rotation of the wheel assembly 11. In some cases, the acceleration sensor 34 has detection axes other than the detection axis 34a. In such a case, accelerations acting along the respective detection axes are individually detected. Hereinafter, the acceleration detected by the acceleration sensor 34 refers to the acceleration detected along the detection axis 34a.

As shown in FIG. 4, the controller 35 is configured by a microcomputer, which includes a CPU 35a, a memory section 35b (such as a RAM and a ROM), and a timer. The memory section 35b stores an ID, which is identification information unique to each transmitter 31. The IDs are used by the receiver 50 to distinguish the transmitters 31.

The controller 35 obtains, at predetermined obtainment intervals, the tire pressure detected by the pressure sensor 32, the tire internal temperature detected by the temperature sensor 33, and the acceleration detected by the acceleration sensor 34. The controller 35 outputs data containing the tire air pressure data, the tire internal temperature data, and the ID to the transmission circuit 36. The transmission circuit 36 generates a transmission signal and wirelessly transmits it from the transmission antenna 39.

The transmission signal is transmitted when the rotational position of the wheel assembly 11 is a predetermined position. The controller 35 outputs the transmission signal when the transmitter 31 is at the lowest position in the wheel assembly 11. The acceleration sensor 34 detects that the transmitter 31 is located at the lowest position from the detected acceleration. Specifically, the acceleration sensor 34 outputs the deformation amount of the detecting section as a voltage containing a direct-current component and an alternating-current component. The direct-current component represents the centrifugal acceleration, and the alternating-current component represents the gravitational acceleration. When the gravitational acceleration detected by the acceleration sensor 34 is +1G, the controller 35 outputs the transmission signal. In this manner, the controller 35 outputs the transmission signal when the transmitter 31 is at the lowest position (a specific position) in the wheel assembly 11.

As shown in FIG. 1A, the receiver 50 includes a reception controller 51, a reception circuit 52, and a reception antenna 56. The reception controller 51 is connected to a display 57. The reception controller 51 is also connected to the ABS controller 25 and the control device 14.

Based on the transmission signal from the reception circuit 52, the reception controller 51 obtains the condition of the tire 13 that corresponds to the transmitter 31 that is the source of the transmission signal. The condition of the tire 13 is, for example, the tire air pressure and the tire internal temperature. The reception controller 51 causes the display 57 to show, for example, the information regarding the air pressures.

The reception controller 51 is configured by a microcomputer including a CPU 54 and a memory section 55 (such as a RAM and a ROM). The memory section 55 stores programs for controlling operations of the receiver 50 in an integrated manner. The reception circuit 52 receives the transmission signals output by the transmitters 31 through the reception antenna 56. The reception circuit 52 demodulates the transmission signals from the transmitters 31 and delivers the signals to the reception controller 51.

The reception controller 51 obtains information regarding the conditions of the tires 13 from the reception circuit 52. In this manner, the reception controller 51 obtains the tire conditions each corresponding to the transmitter 31 that is the source of the received data and displays, for example, the information regarding the tire air pressure on the display 57. Also, the reception controller 51, which functions as an obtaining section, obtains the pulse count values (detection values) of the rotation sensor units 21 to 24 from the ABS controller 25.

A description will be given of the wheel assembly position identifying apparatus, which identifies in which of the wheel assemblies 11 each transmitter 31 is provided.

Figure 5:
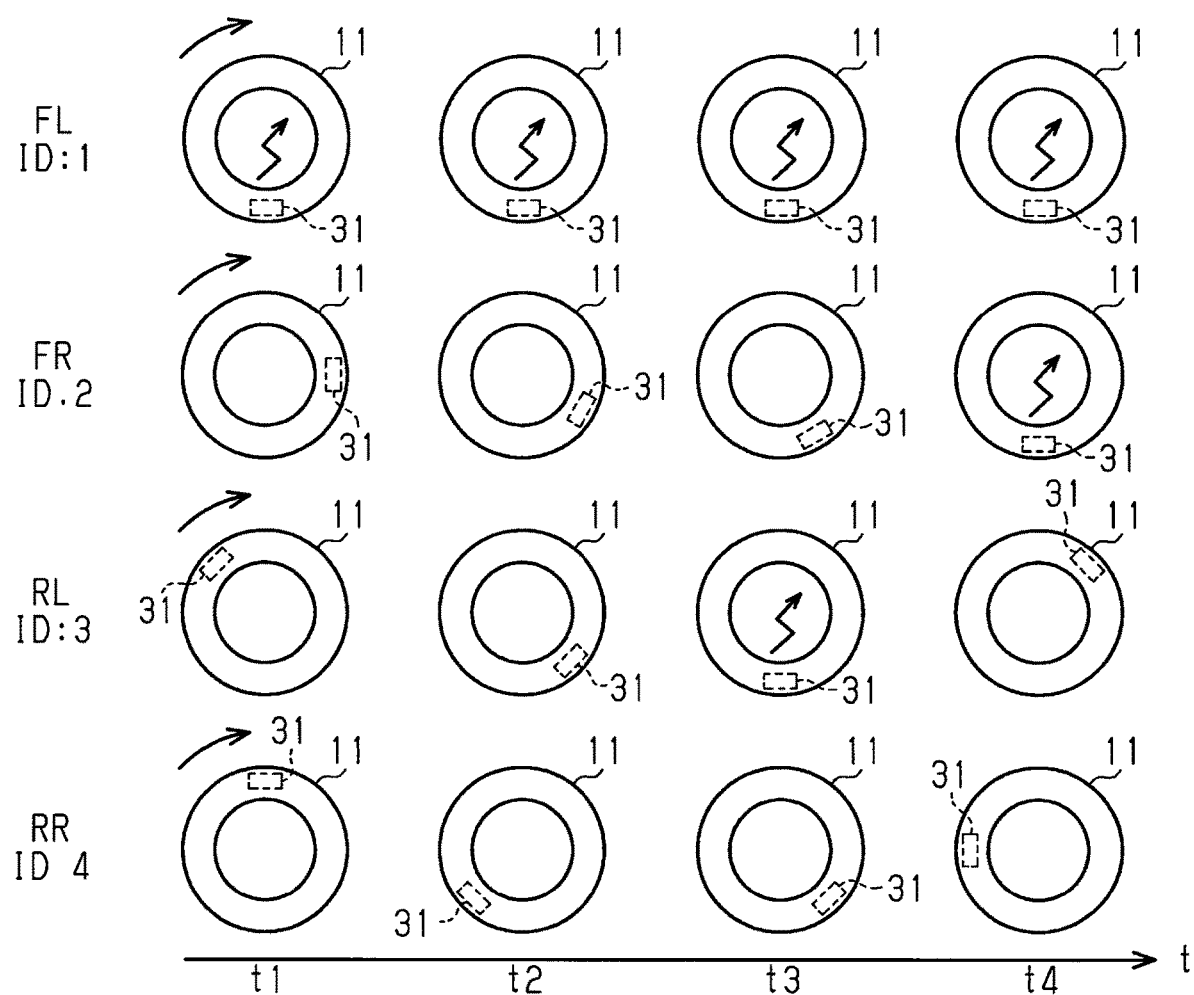
FIG. 5 is a schematic diagram schematically showing the rotational positions of the wheel assemblies when the left-front wheel assembly transmits a transmission signal.
Figure 6:
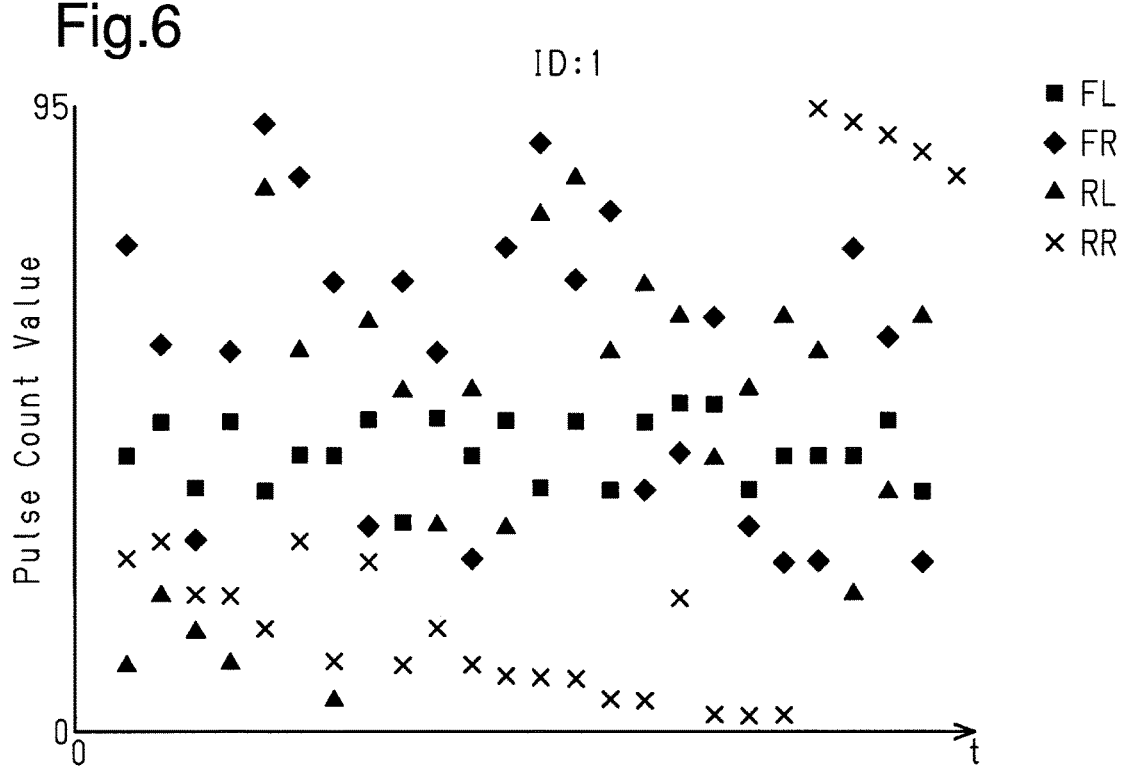
FIG. 6 is a graph showing the pulse count values of the respective rotation sensor units when receiving transmission signals transmitted from the transmitter of ID1.

FIG. 5 illustrates a case in which the transmitter 31 of ID1 is provided in the left-front wheel assembly FL, the transmitter 31 of ID2 is provided in the right-front wheel assembly FR, the transmitter 31 of ID3 is provided in the left-rear wheel assembly RL, and the transmitter 31 of ID4 is provided in the right-rear wheel assembly RR. The transmitter 31 of ID1 outputs the transmission signal at points in time t1, t2, t3, and t4, at which the transmitter 31 passes the lowest position in the wheel assembly 11. That is, the wheel assembly provided with the transmitter 31 of ID1 is at the same rotational positions at the points in time t1, t2, t3, and t4. On the other hand, the rotational speeds of the wheel assemblies 11 differ, for example, due to the influence of the differential gear. Thus, the rotational positions of the wheel assemblies 11 provided with the transmitters 31 of ID2, ID3, and ID4 differ at the points in time t1, t2, t3, and t4. Therefore, if the pulse count values detected by the rotation sensor units 21 to 24 are detected when the reception circuit 52 receives the transmission signal from the transmitter 31 of ID1, the pulse count values detected by the first rotation sensor unit 21, which corresponds to the left-front wheel assembly FL, vary by the smallest degree as indicated by the squares in FIG. 6. In this manner, based on the variations of the pulse count values from the rotation sensor units 21 to 24, the positions of the wheel assemblies 11, which are provided with the transmitters 31, can be identified. To identify the positions of the wheel assemblies 11, the present embodiment employs, in combination, a first wheel assembly position identifying process and a second wheel assembly position identifying process.

Figure 7:
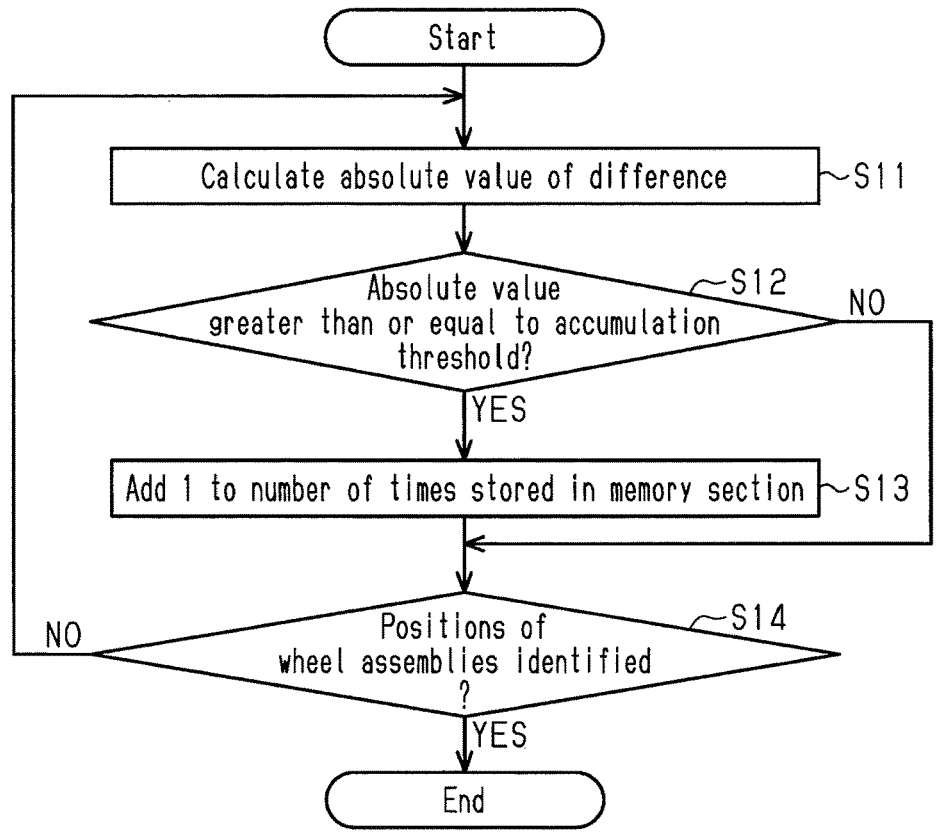
FIG. 7 is a flowchart showing a first wheel assembly position identifying process.

As shown in FIG. 7, in step S11 of the first wheel assembly position identifying process, the reception controller 51 calculates the absolute value of the difference between the obtained pulse count value and the previously obtained pulse count value. The reception controller 51, which functions as a calculating section, calculates the difference (hereinafter, referred to as the difference) between the obtained pulse count value and the pulse count value that was obtained one cycle ago (hereinafter referred to as the previously obtained count value). For example, the absolute value of the difference between the pulse count value of 56 and the pulse count value of 38 is 18, and the absolute value of the difference between the pulse count value of 41 and the pulse count value of 82 is 41.

In step S12, the reception controller 51 determines whether the absolute value of the difference between the pulse count values is greater than or equal to an accumulation threshold, which is the threshold used in the first wheel assembly position identifying process. If the outcome of step S12 is positive, the reception controller 51 executes step S13. In contrast, if the outcome of step S12 is negative, the reception controller 51 executes step S14.

Figure 8:
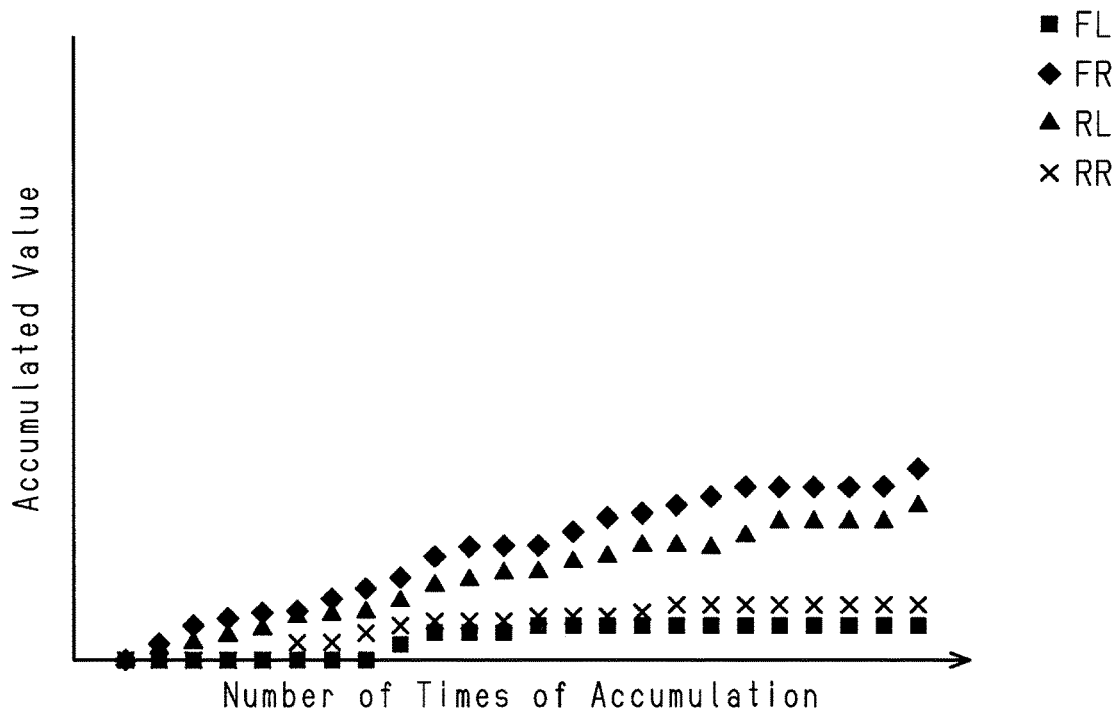
FIG. 8 is a graph showing accumulated values of the numbers of times differences are determined to be greater than or equal to an accumulation threshold by the first wheel assembly position identifying process.

In step S13, the reception controller 51 accumulates the number of times the absolute value of the difference between the pulse count values is greater than or equal to the accumulation threshold. Specifically, the memory section 55 stores the number of times the absolute value of the difference between the pulse count values was greater than or equal to the accumulation threshold. When the absolute value of the difference between the pulse count values is greater than or equal to the accumulated value threshold, the reception controller 51 adds 1 to the number of times stored in the memory section 55. In this manner, the number of times the absolute value of the difference between the pulse count values is greater than or equal to the accumulation threshold is accumulated. The accumulation threshold is set in consideration of the tolerances of each member of the transmitter 31 and the receiver 50. Specifically, the accumulation threshold is set based on the permissible range of deviations of the pulse count value to the extent that the transmitter 31 can be regarded as having transmitted the transmission signal after passing the specific position of the wheel assembly 11. The accumulation threshold is set to, for example, the pulse count of 10. Classifying the received transmission signals according to the ID shows that there is a rotation sensor unit in which the variation of the pulse count values obtained when the transmission signals are obtained is small. FIG. 8 shows the accumulated values of the number of times the difference between the pulse count values is determined to be greater than or equal to the accumulation threshold when the pulse count values were obtained through reception of the transmission signals for the respective IDs. As shown in FIG. 8, the number of times the absolute value of the difference between the pulse count values is greater than or equal to the accumulation threshold is the smallest for the wheel assembly 11 provided with the transmitter 31 of the corresponding ID.

As shown in FIG. 7, in step S14, the reception controller 51 identifies the positions of the wheel assemblies 11, which are provided with the transmitter 31. Then, when the positions of the wheel assemblies 11, which are provided with the transmitter 31, are identified, the reception controller 51 ends the first wheel assembly position identifying process. In contrast, when the positions of the wheel assemblies 11, which are provided with the transmitters 31, are not identified, the reception controller 51 performs the above-described series of processes when a pulse count value is newly obtained. The position of the wheel assembly 11 is identified, for example, in the following manner. First, the reception controller 51 calculates the accumulated value when the difference between the pulse count values is greater than or equal to the accumulation threshold for each ID. Then, the reception controller 51, which functions as a first identifying section, identifies the wheel assembly 11 corresponding to one of the rotation sensor units 21 to 24 having the lowest accumulated value and determines that that wheel assembly 11 is provided with the transmitter 31 of the corresponding ID. From the results shown in FIG. 8, the accumulated value of the first rotation sensor unit 21 is the lowest. Therefore, it can be determined that the transmitter 31 of ID 1 is provided in the left-front wheel assembly FL, which corresponds to the first rotation sensor unit 21.

As described above, in the first wheel assembly position identifying process, the positions of the wheel assemblies 11, which are provided with the transmitters 31, are identified from the differences in the rotational positions based on the rotational speeds of the wheel assemblies 11. The cases in which the differences in the rotational speeds of the wheel assemblies 11 increases include a case in which the vehicle 10 turns and a case in which the vehicle 10 is traveling on a road with great undulations. When the vehicle 10 is traveling in a straight line, the rotational speeds of the wheel assemblies 11 are unlikely to differ. For example, as in the case of the right-rear wheel assembly RR shown in FIG. 6, although the pulse count value decreases with the lapse of time, the variation cannot be identified only by pulse count values of two cycles, which are the obtained pulse count value and the previously obtained pulse count value. In this case, the time to identify the positions of the wheel assemblies 11, which are provided with the transmitters 31, is extended. Therefore, the use of the second wheel assembly position identifying process in combination shortens the time to identify the positions of the wheel assemblies 11.

Figure 9:
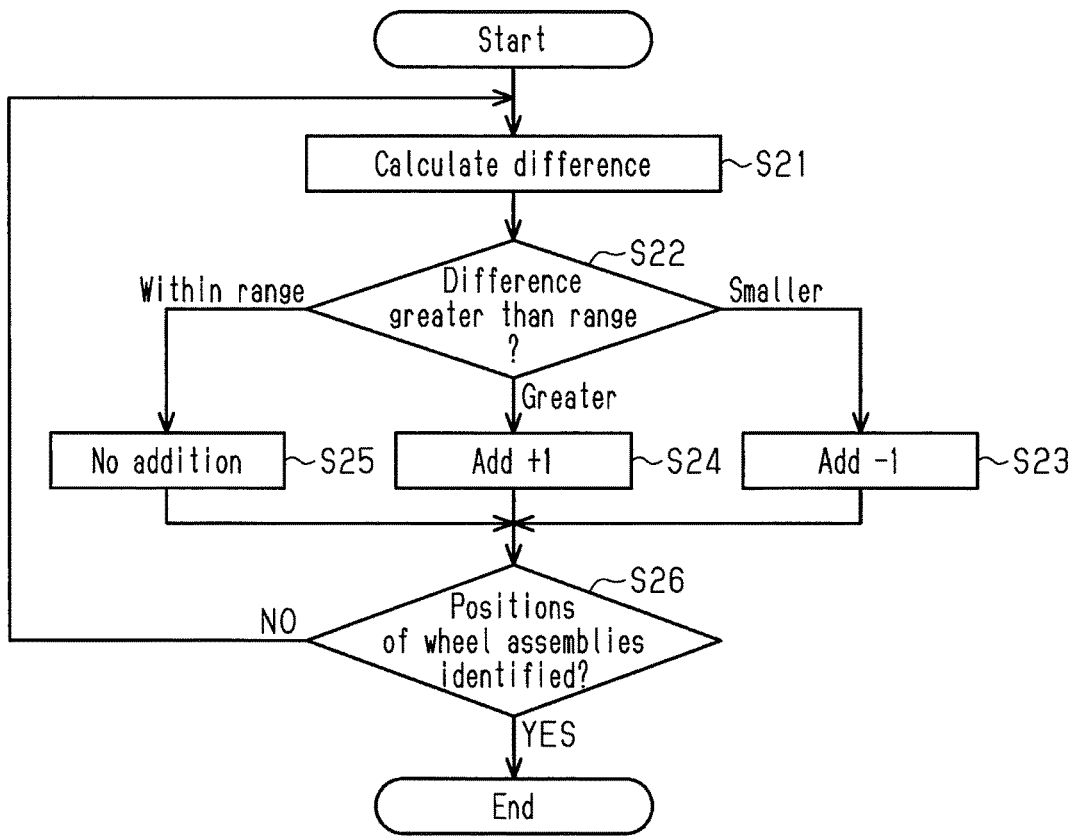
FIG. 9 is a flowchart showing a second wheel assembly position identifying process.

As shown in FIG. 9, in step S21 of the second wheel assembly position identifying process, the reception controller 51 calculates the difference between the obtained pulse count value and the previously obtained pulse count value (the obtained pulse count value–the previously obtained pulse count value).

Next, in step S22, the reception controller 51 determines whether the difference between the pulse count values is within a predetermined range, which is a threshold used in the second wheel assembly position identifying process. The predetermined range extends over positive values and negative values. For example, the predetermined range includes pulse counts from −2 to +2. In the second wheel assembly position identifying process, the predetermined range is set smaller than the accumulation threshold in order to determine whether the pulse count value is deviating in the positive direction or the negative direction in relation to the range.

If the difference between the pulse count values is out of the predetermined range, the reception controller 51 adds either a positive value or a negative value to the accumulated value depending on whether the difference between the pulse count values is greater or smaller than the predetermined range. If the difference between the pulse count values is smaller than the predetermined range, the reception controller 51 adds −1 to the accumulated value stored in the memory section 55 in step S23. If the difference between the pulse count values is greater than the predetermined range, the reception controller 51 adds +1 to the accumulated value stored in the memory section 55 in step S24. If the difference between the pulse count values is within the predetermined range, the reception controller 51 does not perform addition in step S25.

The position at which the transmission signal is transmitted from each transmitter 31 varies around the specific position. In this case, the number of the transmission signals transmitted before the rotational position of the wheel assembly 11 reaches the specific position is likely to be close to the number of the transmission signals transmitted after the rotational position of the wheel assembly 11 has passed the specific position. Therefore, in the wheel assembly 11 in which the transmitter 31 that has transmitted the transmission signal is provided, the number of times the difference between the pulse count values exceeds the predetermined range is likely to be close to the number of times the difference between the pulse count values becomes smaller than the predetermined range. When the difference between the pulse count values is greater than the predetermined range, the reception controller 51 adds +1 to the accumulated value. When the difference between the pulse count values is smaller than the predetermined range, the reception controller 51 adds −1 to the accumulated value. Therefore, the accumulated value of the wheel assembly 11 in which the transmitter 31 that has transmitted the transmission signal is provided is closer to 0 than the accumulated values of all the other wheel assemblies 11.

In step S26, the reception controller 51 identifies the positions of the wheel assemblies 11, which are provided with the transmitters 31, and then ends the second wheel assembly position identifying process. In contrast, when the positions of the wheel assemblies 11, which are provided with the transmitters 31, are not identified, the reception controller 51 performs the above-described series of processes when a pulse count value is newly obtained. The position of the wheel assembly 11 is identified, for example, in the following manner. First, the reception controller 51 calculates the accumulated value for each ID. Then, the reception controller 51, which functions as a second identifying section, determines that the transmitter 31 of the corresponding ID is provided in the wheel assembly 11 corresponding to one of the rotation sensor units 21 to 24 of which the accumulated value is closest to 0. From the results shown in FIG. 10, the accumulated value detected by the first rotation sensor unit 21 is closest to zero. Therefore, it can be determined that the transmitter 31 of ID1 is provided in the left-front wheel assembly FL, which corresponds to the first rotation sensor unit 21.

In the present embodiment, by using in combination the first wheel assembly position identifying process and the second wheel assembly position identifying process, the positions of the wheel assemblies 11, which are provided with the transmitters 31, are identified. For example, the second wheel assembly position identifying process may be executed only when the wheel assemblies 11, which are provided with the transmitters 31, cannot be identified by the first wheel assembly position identifying process. Also, the first wheel assembly position identifying process and the second wheel assembly position identifying process may be performed in parallel. In this case, when the wheel assemblies 11 identified by the first wheel assembly position identifying process match with the wheel assemblies 11 identified by the second wheel assembly position identifying process, the wheel assemblies 11 may be identified as the wheel assemblies 11 that are provided with the transmitters 31. In addition, accumulated values may be calculated by classifying the transmission signals according to the ID in the first and second wheel assembly position identifying processes, and the accumulated value calculated by the first wheel assembly position identifying process and the accumulated value calculated by the second wheel assembly position identifying process may be added up. In the wheel assembly 11 provided with the transmitter 31 that has transmitted the transmission signal, the sum of the accumulated value calculated by the first wheel assembly position identifying process and the accumulated value calculated by the second wheel assembly position identifying process is closest to 0. Thereby, the positions of the wheel assemblies 11, which are provided with the transmitters 31, may be identified.

The first and second wheel assembly position identifying processes are started when the ignition switch 15 is turned on. Also, the first and second wheel assembly position identifying processes are terminated when the position of the wheel assemblies 11, which are provided with the transmitters 31, are identified. The pulse count values are reset each time the ignition switch 15 is turned off. Therefore, the "previously obtained pulse count value" refers to a pulse count value obtained after the ignition switch 15 was turned on, but not a pulse count value obtained before the ignition switch 15 was turned on. In the present embodiment, the receiver 50 is the wheel assembly position identifying apparatus.

An operation of the wheel assembly position identifying apparatus according to the present embodiment will now be described.

Upon receiving the transmission signals, the reception controller 51 obtains the pulse count values of the rotation sensor units 21 to 24.

In the first wheel assembly position identifying process, the reception controller 51 calculates the difference between the obtained pulse count value and the previously obtained pulse count value. Then, from the number of times (the accumulated value) the absolute value of the difference between the pulse count values is greater than or equal to the accumulation threshold, the reception controller 51 identifies in which of the wheel assemblies 11 each transmitter 31 is provided.

In the second wheel assembly position identifying process, the reception controller 51 calculates the difference between the obtained pulse count value and the previously obtained pulse count value. The reception controller 51 then accumulates either a positive value or a negative value depending on whether the difference between the pulse count values is greater than or smaller than the predetermined range. Then, from the accumulated value, the reception controller 51 identifies in which of the wheel assemblies 11 each transmitter 31 is provided.

That is, in the first wheel assembly position identifying process and the second wheel assembly position identifying process, the reception controller 51 performs a threshold process, in which the reception controller 51 calculates the difference between the obtained pulse count value and the previously obtained pulse count value and compares the difference with the threshold. Then, the reception controller 51 identifies the positions of the wheel assemblies 11, which are provided with the transmitters 31, by comparing the difference between the pulse count values with the threshold.

The reception controller 51 identifies the positions of the wheel assemblies 11 by using the first wheel assembly position identifying process and the second wheel assembly position identifying process in combination. In the first wheel assembly position identifying process, the reception controller 51 determines whether the absolute value of the difference between the pulse count values is greater than or equal to the accumulation threshold. The reception controller 51 then accumulates the number of times the absolute value of the difference between the pulse count values is greater than or equal to the accumulation threshold. Therefore, the time required to identify the positions of the wheel assemblies 11 is extended in a case in which there is a wheel assembly 11 that is not provided with the transmitter 31 that has transmitted the transmission signal but the rotational speed of that wheel assembly 11 fluctuates only by a small amount in a short time. Specifically, in order to identify the positions of the wheel assemblies 11 by the first wheel assembly position identifying process in such a case, it is necessary to identify the positions of the wheel assemblies 11 from the difference between the obtained pulse count value and, for example, the pulse count value that was obtained five cycles ago. That is, even if the pulse count value only slightly fluctuates in a short time, the difference between the pulse count values is calculated assuming that the pulse count value changes by a degree greater than the accumulation threshold in a long time.

In this case, although the positions of the wheel assemblies 11, which are provided with the transmitters 31, can be identified, the time required to identify the positions of the wheel assemblies 11 is extended. On the other hand, even if the pulse count value changes only slightly in a short time, the second wheel assembly position identifying process can identify the positions of the wheel assemblies 11, which are provided with the transmitters 31.

In the second wheel assembly position identifying process, the number of times the difference between the pulse count values becomes smaller than the predetermined range of the wheel assembly 11 that is not provided with the transmitter 31 that has transmitted the transmission signal may accidentally become close to the number of times the difference between the pulse count values becomes greater than the predetermined range. In such a case, the time required to identify the positions of the wheel assemblies 11 is extended. Even in this case, the first wheel assembly position identifying process is capable of identifying the positions of the wheel assemblies 11, which are provided with the transmitters 31, by determining whether the absolute value of the difference between the pulse count values is greater than or equal to the accumulation threshold. By using the first wheel assembly position identifying process and the second wheel assembly position identifying process in combination, it is possible to cancel out the disadvantages of the respective processes, and the positions of the wheel assemblies 11, which are provided with the transmitters 31, are identified in a short time.

The above-described embodiment achieves the following advantages.

(1) The reception controller 51 calculates the difference between the obtained pulse count value and the previously obtained pulse count value. The reception controller 51 identifies the positions of the wheel assemblies 11, which are provided with the transmitters 31, by comparing the difference between the pulse count values with the threshold. The above series of processing by the reception controller 51 is composed of the calculation of the difference between the pulse count values, the comparison of the difference between the pulse count values with the threshold, and the accumulation according to the comparison result. Therefore, the load on the reception controller 51 is reduced as compared with the case where advanced statistical processing is used. When the load on the reception controller 51 is large, there may be omission of the air pressure data included in the transmission signals or it may take a long time to obtain the air pressure data. These problems can be solved by reducing the load on the reception controller 51.

(2) In the first wheel assembly position identifying process, the reception controller 51 determines whether the absolute value of the difference between the pulse count values is greater than or equal to the accumulation threshold. The reception controller 51 then accumulates the number of times the absolute value of the difference between the pulse count values is greater than or equal to the accumulation threshold. When the pulse count values at the time of receiving a transmission signal are classified according to the ID, the variation of the pulse count value of the rotation sensor unit corresponding to the wheel assembly 11 provided with the transmitter 31 of the corresponding ID is the smallest. Therefore, the difference between the pulse count values is also the smallest. Thus, by determining whether the absolute value of the difference between the pulse count values is greater than or equal to the accumulation threshold, the reception controller 51 can determine in which of the wheel assemblies 11 each transmitter 31 is provided.

(3) In the second wheel assembly position identifying process, the reception controller 51 accumulates either a positive value or a negative value depending on whether the difference between the pulse count values is greater than or smaller than the predetermined range. When the pulse count values at the time of receiving a transmission signal are classified according to the ID, the number of times the difference between the pulse count values of the wheel assembly 11 provided with the transmitter 31 of the corresponding ID becomes larger than the predetermined range is likely to approach the number of times the difference between the pulse count values becomes smaller than the predetermined range. Therefore, the reception controller 51 adds either a positive value or a negative value to the accumulated value depending on whether the difference between the pulse count values is greater or smaller than the predetermined range. Thereby, the positions of the wheel assemblies 11, which are provided with the transmitters 31, are identified.

The above-described embodiment may be modified as follows.

In the first and second wheel assembly position identifying processes, the pulse count value that was obtained two or more cycles ago (for example, two cycles ago) may be used as the previously obtained pulse count value. In this case, the positions of the wheel assemblies 11, which are provided with the transmitters 31, may be identified by using only the accumulated value corresponding to the difference between the obtained pulse count value and the pulse count value that was obtained two or more cycles ago. Further, the positions of the wheel assemblies 11, which are provided with the transmitters 31, may be identified separately from the accumulated value corresponding to the difference between the obtained pulse count value and the pulse count value that was obtained two or more cycles ago and from the accumulated value corresponding to the difference between the obtained pulse count value and the pulse count value that was obtained the last cycle. In this case, the positions of the wheel assemblies 11 may be identified by the consistency (majority rule) of the wheel assemblies 11 identified by the respective wheel assembly position identifying process.

In addition to the first and second wheel assembly position identifying processes, the wheel assembly position identifying apparatus may identify the positions of the wheel assemblies 11 using a different wheel assembly position identifying process. Also, in order to identify the positions of the wheel assemblies 11, the wheel assembly position identifying apparatus may use only the first wheel assembly position identifying process. In addition to the first wheel assembly position identifying process, the wheel assembly position identifying apparatus may use a wheel assembly position identifying process different from the second wheel assembly position identifying process. Also, in order to identify the positions of the wheel assemblies 11, the wheel assembly position identifying apparatus may use only the second wheel assembly position identifying process. In addition to the second wheel assembly position identifying process, the wheel assembly position identifying apparatus may use a wheel assembly position identifying process different from the first wheel assembly position identifying process.

In the second wheel assembly position identifying process, the positive and negative values added to the accumulated value when the difference between the pulse count values is outside the predetermined range may be changed as necessary. For example, +2 may be added to the accumulated value when the difference between the pulse count values is greater than the predetermined range, and −2 may be added to the accumulated value when the difference between the pulse count values is smaller than the predetermined range. It is preferable to use the positive and negative values with the same absolute value as the value to be added, but it is not limited to this. For example, +2 may be added to the accumulated value when the difference between the pulse count values is greater than the predetermined range, and −2 may be added to the accumulated value when the difference between the pulse count values is smaller than the predetermined range.

In the second wheel assembly position identifying process, the predetermined range does not need to extend over positive values and negative values. The predetermined range may be lopsided to the positive side. For example, the predetermined range may include pulse counts from 0 to +2 or pulse counts from +1 to +3. Also, the predetermined range may be lopsided to the negative side. For example, the predetermined range may include pulse counts from −2 to 0 or pulse counts from −1 to −3. In these cases, when it is determined whether the difference between the pulse count values is larger or smaller than the predetermined range, there will be an imbalance between the number of times the difference between the pulse count values becomes greater than the predetermined range and the number of times the difference between the pulse count values becomes smaller than the predetermined range. In other words, if the sign of the added value is changed depending on whether the difference between the pulse count values is greater than or smaller than the predetermined range, the lopsidedness of the accumulated value either to the positive side or the negative side increases (the absolute value increases). Even in this case, it is possible to determine in which of the wheel assemblies 11 each transmitter 31 is provided. In this case, however, since the accumulated value is lopsided either to the positive side or the negative side, it may be difficult to identify the positions of the wheel assemblies 11. Therefore, when using a range that is lopsided either to the positive side or the negative side as the predetermined range, it is preferable to add a lopsidedness correction factor to the accumulated value. The lopsidedness correction factor is a factor for correcting the lopsidedness of the accumulated value caused by the lopsidedness of the predetermined range. The lopsidedness correction factor is a value calculated in accordance with the predetermined range. The lopsidedness correction factor is set such that the absolute value of the accumulated value of one of the rotation sensor units 21 to 24 that corresponds to the wheel assembly 11 provided with the transmitter 31 that has transmitted the transmission signal approaches zero.

As described in the embodiment, the reception controller 51 classifies the received transmission signals according to the ID and calculates the accumulated value. The reception controller 51 multiplies, by the lopsidedness correction factor, the number of times the reception controller 51 has determined whether the difference between the pulse count values is within the predetermined range (the number of times of the execution of step S22). The reception controller 51 then adds the resultant value to the accumulated value. Subsequently, the reception controller 51 calculates corrected accumulated values by classifying the values according to the ID. The reception controller 51 determines that the transmitter 31 of the corresponding ID is provided in the wheel assembly 11 that corresponds to one of the rotation sensor units 21 to 24 of which the absolute value of the corrected accumulated value, which has been classified according to the ID, is the smallest (close to 0).

In the first wheel assembly position identifying process, the number of times the absolute value of the difference between the pulse count values becomes less than the accumulation threshold may be accumulated. In this case, the number of times the absolute value of the difference between the pulse count values becomes less than the threshold is the greatest in the wheel assembly 11 in which the transmitter 31 that has transmitted the transmission signal is provided.

The display 57 does not need to be provided in the vehicle 10, but may be replaced by a display such as a portable device carried by the driver.

The vehicle 10 does not need to be a four-wheel vehicle, but may be any type as long as it has two or more wheel assemblies 11.

In the illustrated embodiment, the rising edges and the falling edges of pulses are both counted. However, only the rising edges or the falling edges may be counted. In that case, the pulse count value would be half the number of the pulse count value in a case in which both the rising edges and the falling edges are counted.

The number of teeth of the gear may be changed. That is, the number of pulses that are generated by each of the rotation sensor units while the wheel assembly 11 is rotated one rotation.

The invention claimed is:
1. A wheel assembly position identifying apparatus, which is mounted in a vehicle having rotational position detecting sections that detect, as detection values, rotational positions of respective wheel assemblies, wherein a transmitter is provided in each of the wheel assemblies, and the apparatus identifies in which of the wheel assemblies each transmitter is provided, the apparatus comprising:
a receiver, which receives transmission signals that are each transmitted from one of the transmitters when the rotational position of the corresponding wheel assembly is a specific position;
an obtaining section, which obtains the rotational position of each wheel assembly from the corresponding rotational position detecting section each time the receiver receives the transmission signal;
a calculating section, which calculates a difference between the rotational position obtained by the obtaining section and a previously obtained rotational position; and
an identifying section, which identifies the positions of the wheel assemblies, which are provided with the transmitters, by comparing the difference with a threshold, wherein
an accumulation threshold is employed as the threshold, the accumulation threshold being used to determine whether the received transmission signal has been transmitted at the specific position, and
the identifying section
determines whether an absolute value of the difference is greater than or equal to the accumulation threshold,
accumulates the number of times the absolute value of the difference is determined to be greater than or equal to the accumulation threshold or the number of times the absolute value of the difference is determined to be less than the accumulation threshold, and
identifies the positions of the wheel assemblies, in which the transmitters are provided, from an accumulated value obtained through the accumulation.

2. A wheel assembly position identifying apparatus, which is mounted in a vehicle having rotational position detecting sections that detect, as detection values, rotational positions of respective wheel assemblies, wherein a transmitter is provided in each of the wheel assemblies, and the apparatus identifies in which of the wheel assemblies each transmitter is provided, the apparatus comprising:
a receiver, which receives transmission signals that are each transmitted from one of the transmitters when the rotational position of the corresponding wheel assembly is a specific position;
an obtaining section, which obtains the rotational position of each wheel assembly from the corresponding rotational position detecting section each time the receiver receives the transmission signal;
a calculating section, which calculates a difference between the rotational position obtained by the obtaining section and a previously obtained rotational position; and
an identifying section, which identifies the positions of the wheel assemblies, which are provided with the transmitters, by comparing the difference with a threshold, wherein
a predetermined range is employed as the threshold, and
the identifying section
determines whether the difference is within the predetermined range,
accumulates either a positive value or a negative value depending on whether the difference is greater than or smaller than the predetermined range, and identifies the positions of the wheel assemblies, in which the transmitters are provided, from an accumulated value obtained through the accumulation.

\* \* \* \* \*